(12) United States Patent
Wu

(10) Patent No.: US 12,395,833 B2
(45) Date of Patent: Aug. 19, 2025

(54) NETWORK ADDRESS ASSIGNMENT/ALLOCATION AND USE IN A MULTI-OPERATOR WIRELESS NETWORK ENVIRONMENT

(71) Applicant: Charter Communications Operating, LLC, St. Louis, MO (US)

(72) Inventor: Deh-Min Richard Wu, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 387 days.

(21) Appl. No.: 17/961,192

(22) Filed: Oct. 6, 2022

(65) Prior Publication Data

US 2024/0121600 A1 Apr. 11, 2024

(51) Int. Cl.
*H04W 8/26* (2009.01)
*H04W 8/12* (2009.01)

(52) U.S. Cl.
CPC .................................. *H04W 8/26* (2013.01)

(58) Field of Classification Search
CPC ....................................................... H04W 8/26
USPC ....................................................... 370/329
See application file for complete search history.

(56) References Cited

U.S. PATENT DOCUMENTS

| 8,145,195 B2 | 3/2012 | Forsberg et al. |
| 8,261,089 B2 | 9/2012 | Cobos et al. |
| 10,448,251 B1 | 10/2019 | Maria |
| 2002/0058494 A1* | 5/2002 | Timonen ............. H04W 12/069 455/406 |
| 2002/0080752 A1* | 6/2002 | Johansson ........... H04L 61/5084 370/338 |
| 2002/0089958 A1* | 7/2002 | Feder ........................ H04L 9/40 370/340 |
| 2002/0164983 A1* | 11/2002 | Raviv ................... H04L 67/565 455/406 |
| 2003/0120594 A1* | 6/2003 | Shaginaw ............ G06Q 20/102 705/40 |

(Continued)

OTHER PUBLICATIONS

3GPP TS 23.501, "3rd Generation Partnership Project; Technical Specification Group Services and System Aspects; System architecture for the 5G System (5GS);Stage 2, (Release 17)", v17.6.0, Sep. 2022, pp. 1-571.

(Continued)

*Primary Examiner* — Mark G. Pannell
(74) *Attorney, Agent, or Firm* — Armis IP Law, LLC

(57) ABSTRACT

A communication management resource receives input from a first wireless network. The input is generated in response to a mobile communication device requesting use of wireless services from the first wireless network; the first wireless network is operated by a first service provider. The communication management resource (such as in or associated with a second wireless network) allocates a network address for use by the mobile communication device. The network address is allocated by an allocation management resource in the second wireless network, which is operated by a second service provider. The communication management resource then communicates the allocated network address from the second wireless network through the first wireless network to the mobile communication device. The mobile communication device uses the network address to communicate through the first wireless network.

28 Claims, 9 Drawing Sheets

(56) References Cited

U.S. PATENT DOCUMENTS

| | | | | |
|---|---|---|---|---|
| 2003/0176188 A1* | 9/2003 | O'Neill | H04L 63/08 | 455/433 |
| 2004/0132449 A1* | 7/2004 | Kowarsch | H04W 4/24 | 455/433 |
| 2004/0162892 A1* | 8/2004 | Hsu | H04L 61/5084 | 709/221 |
| 2004/0193712 A1* | 9/2004 | Benenati | H04W 12/0431 | 709/225 |
| 2005/0195766 A1* | 9/2005 | Nasielski | H04W 8/12 | 370/335 |
| 2005/0221853 A1 | 10/2005 | Silvester | | |
| 2006/0205404 A1* | 9/2006 | Gonen | H04W 8/06 | 455/433 |
| 2006/0234705 A1* | 10/2006 | Oommen | H04L 12/66 | 455/435.2 |
| 2006/0282554 A1* | 12/2006 | Jiang | H04W 8/183 | 710/14 |
| 2007/0093248 A1* | 4/2007 | Gelderblom | H04W 76/18 | 455/445 |
| 2007/0191006 A1* | 8/2007 | Carpenter | H04W 48/16 | 455/435.2 |
| 2007/0281687 A1* | 12/2007 | Jiang | H04W 8/20 | 455/433 |
| 2008/0263631 A1* | 10/2008 | Wang | H04L 63/102 | 726/2 |
| 2009/0044257 A1* | 2/2009 | Zhao | H04W 12/084 | 726/4 |
| 2009/0197597 A1* | 8/2009 | Kotecha | H04W 8/082 | 455/433 |
| 2010/0088400 A1* | 4/2010 | Andreasen | H04W 8/26 | 709/245 |
| 2010/0246509 A1* | 9/2010 | Chen | H04W 60/00 | 370/329 |
| 2014/0141839 A1* | 5/2014 | Larsson | H04W 48/04 | 455/558 |
| 2014/0280938 A1* | 9/2014 | Kadaba | H04L 12/4633 | 709/225 |
| 2015/0358806 A1* | 12/2015 | Salqvist | H04W 8/12 | 455/433 |
| 2023/0319755 A1* | 10/2023 | Chun | H04W 4/60 | 370/329 |

OTHER PUBLICATIONS

Broadband Forum Technical Report, TR-456, AGF Functional Requirements, Issue: 02, Issue Date: Mar. 2022, pp. 1-131.

\* cited by examiner

NETWORK ADDRESS ASSIGNMENT/ALLOCATION AND USE IN A MULTI-OPERATOR WIRELESS NETWORK ENVIRONMENT

BACKGROUND

Conventional authentication methods focus on how to verify a true identity of a mobile communication device. The information exchanged between the device and the system (authentication server, public visiting and home wireless/ wireline network) has to be securely encrypted and the data well protected.

A mobile communication device connected to its home residential gateway obtains its IP (Internet Protocol) network address allocation from a respective home residential gateway. The network address is a home local IP address. The home residential gateway receives an IP address from the access network, which is local in the access network.

BRIEF DESCRIPTION OF EMBODIMENTS

This disclosure includes the observation that when a 3GPP 5G core node is used to provide direct wireless connectivity to a device, independent of the access network to support fixed mobile convergence, there is an issue about how to implement a DHCP server in the core network as well as how to provide the mobile communication device an IP address for use outside of the home network environment. The conventional home core network as discussed above does not have a direct binding to the mobile communication device behind the gateway and does not have control on the QoS parameters for a device behind the gateway. In such an instance, the visited wireless network is unable to provide a control policy in accordance with the home wireless network to which the mobile communication device belongs.

Embodiments herein include novel ways of defining how a respective mobile device does not need to be authenticated by a visiting network (second wireless network service provider) but can rely instead on a device's home network (H-MVNO, first wireless network service provider). For example, a conventional implementation includes use of an MVNO architecture in which a mobile communication device (including a SIM) is authenticated by the MVNO network and there is no control/user plane signaling back to the H-MVNO. This does not permit the potential implementation of features such as: i) utilizing individual subscription profile of our customers to meet differentiated treatment, e.g., VIP (highest) level traffic service, and ii) dynamically adapting the service type with differentiated traffic class in which our home network intends to support, e.g., matching service flow with an on-demand QoS class.

Examples as discussed herein provide improved implementation of controlling connectivity of a mobile communication device in a so-called visited (a.k.a., visiting) wireless network. For example, the prior art does not use SMF/AAA (e.g. Spectrum) to authenticate the devices. There is no control plane interaction between the MNO and H-MVNO (e.g. between Verizon and Spectrum) for the subscriber authentication/authorization when a H-MVNO (Spectrum) customer is moving to MNO (Verizon) network. Network connectivity as discussed herein is granted to the device to access the visiting network based on a service agreement between a home wireless network service provider and a visited wireless network service provider. The wireless connectivity used by the mobile communication device requesting wireless services as discussed herein may be restricted over the control plane for authentication purposes. The visited wireless network does not authenticate the device, but instead forwards the procedure of authentication for handling by the home wireless network.

Further examples as discussed herein implement one or more AAA servers to authenticate a mobile communication device for a roaming case where the mobile communication device uses a visited wireless network for wireless services, not an HSS or UDM (Unified Data Management). In contrast to conventional techniques of the visited wireless network being unable to support subscriber service capabilities, the disclosure herein can be configured to use the customer's subscriber data (such as policy) to support service capabilities. Further, in contrast to conventional techniques in which user data transport is via the H-MVNO network, this disclosure can be configured to use the visited wireless network for data transport. The usage by the mobile communication device in the visited wireless network is reported from the visited wireless network to the home wireless network.

Techniques as discussed herein also address issues such as where should a DHCP server be located in the core of a home network environment? How can a mobile communication device in a visited wireless network (i.e., outside a home wireless network to which a respective subscriber of the mobile communication device subscribes) obtain an IP address from the core management node of the home wireless network? Among other things, examples as discussed herein illustrate how the wireless connectivity of the mobile communication device to the visited wireless network is controlled by the core node of a home wireless network.

More specifically, a communication management resource receives input from a first wireless network. The input is generated in response to a mobile communication device requesting use of wireless services from the first wireless network; the first wireless network is operated by a first service provider. The communication management resource (such as in a second wireless network) allocates a network address for use by the mobile communication device. The network address can be allocated or generated by any suitable entity such as an allocation management resource in the second wireless network operated by a second service provider. Alternatively, the allocation management resource can be located outside of the second wireless network at any suitable location. The communication management resource then communicates the allocated network address from the second wireless network through the first wireless network to the mobile communication device.

In one embodiment, the communication management resource allocates the network address in response to (or subsequent to) authentication of the mobile communication device.

In further example embodiments, the input from the first wireless network may include authentication credentials provided by the mobile communication device to obtain the network address.

In still further example embodiments, the first wireless network is a so-called visiting wireless network (in which the user of the mobile communication device does not subscribe); the second wireless network is so-called home wireless network to which a user of the mobile communication device subscribes. The second wireless network service provider provides wireless access to the mobile communication device based on a service agreement between the second wireless network service provider and the first wireless network service provider.

Further embodiments herein include, via the communication management resource, based on the input, and authentication of the mobile communication device to use the first wireless network, retrieving a service policy assigned to the mobile communication device; and communicating the service policy to the first wireless network. The service policy provided by the second wireless network controls communications between mobile communication device through the first wireless network and a remote network based on the network address allocated to the mobile communication device.

Yet further example embodiments herein include, via the communication management resource, programming the mobile communication device to include a network identifier value assigned to the first wireless network. The communication management resource can be configured to provide notification to the mobile communication device that the first wireless network is part of or related to the second wireless network.

Note that the input associated with the mobile communication device requesting use of wireless services can be received in any suitable manner. In one embodiment, the communication management resource receives the input through a temporary WAN (Virtual Local Area Network) provided by the first wireless network to the mobile communication device.

In still further example embodiments, the first wireless network provides wireless connectivity to the mobile communication device in accordance with SIM (Subscriber Identity Module) assigned to the mobile communication device to use the second wireless network. The second wireless network controls attributes of the first wireless network providing wireless connectivity to the first wireless network.

The communication management resource can be configured to receive wireless link usage information of the mobile communication device using the first wireless network. The wireless link usage information may be generated by the first wireless network. The second wireless network can be configured to apply the wireless link usage information to an account associated with a user of the mobile communication device.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately located processor devices or hardware) to: receive input from a first wireless network, the input generated in response to a mobile communication device requesting use of wireless services associated with the first wireless network, the first wireless network operated by a first service provider; allocate a network address for use by the mobile communication device, the network address allocated by an allocation management resource in a second wireless network operated by a second service provider; and communicate the allocated network address from the second wireless network through the first wireless network to the mobile communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
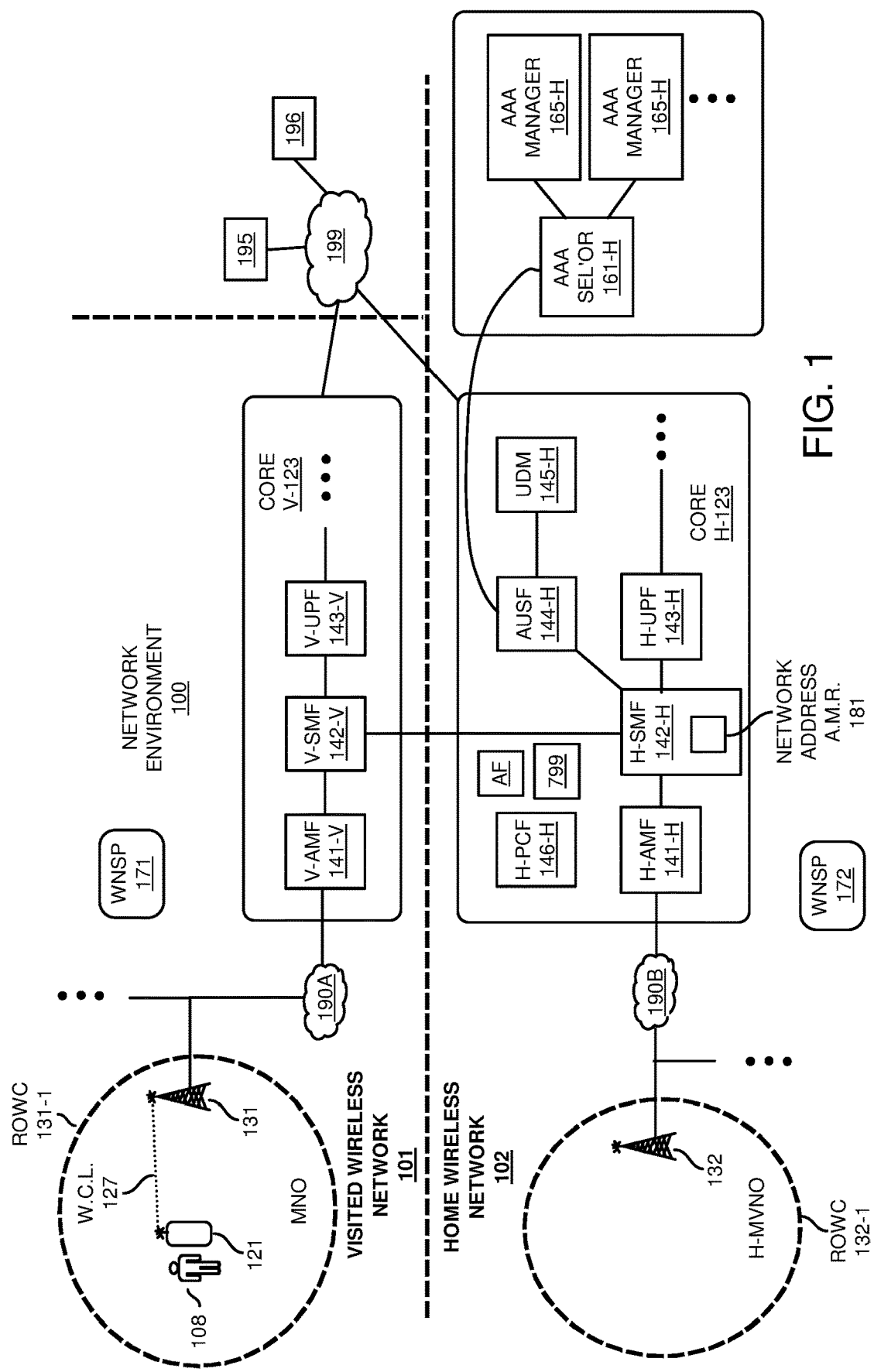
FIG. 1 is an example diagram illustrating a network environment including a first wireless network operated by a first wireless network service provider and a second wireless network operated by a second wireless network service provider as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A communication management resource receives input from a first wireless network. The input is generated in response to a mobile communication device requesting use of wireless services from the first wireless network; the first wireless network is operated by a first service provider. The communication management resource (such as in or associated with a second wireless network) allocates a network address for use by the mobile communication device. The second wireless network (such as including an allocation management resource that allocated the network address) is operated by a second service provider. The communication management resource then communicates the allocated network address from the second wireless network through the first wireless network to the mobile communication device. The mobile communication device uses the network address to communicate with a remote network through the first wireless network. Accordingly, the first wireless network can be configured to provide wireless connectivity of the mobile communication device to the remote network.

Now, more specifically, FIG. 1 is an example diagram illustrating a network environment including a first wireless network operated by a first wireless network service provider and a second wireless network operated by a second wireless network service provider as discussed herein.

As shown, communication system 100 includes communication device 121 operated by a user 108. The communication device 121 can be operated in visited wireless network 101 (a.k.a., visiting wireless network) or home wireless network 102.

By way of a non-limiting example, each of the communication device 121 can be any suitable type of device such as a cellular phone device, user equipment, mobile device, personal digital assistant, touch pad device, portable computer, wire-line telephone, wireless phone, wireless mobile device, etc.

Visited wireless network 101 includes wireless access point 131 (such as a wireless base station supporting region of wireless coverage 131-1, network 190A, and core network V-123. Visited wireless network 101 can be configured to any number of wireless access points similar to wireless access point 131. In this example, the core network V-123 includes communication management resource V-AMF 141-V (such as an Access and Mobility Management Function), communication management resource V-SMF 142-V (such as a Session Management Function), communication management resource V-UPF 143-V (such as a so-called User Plane Function), network 190, etc.

Home wireless network 102 includes wireless access point 132 (such as a wireless base station) supporting region of wireless coverage 132-1, network 190B, and core network H-123. Home wireless network 102 can be configured to any number of wireless access points similar to wireless access point 132. In this example, the core network H-123 includes communication management resource H-AMF 141-H (such as an Access and Mobility Management Function), communication management resource H-SMF 142-H (such as a Session Management Function), communication management resource H-UPF 143-H (such as a so-called User Plane Function), access function AF, policy control information 799, network 190, etc. Communication management resource H-SMF 142-H includes a network address allocation management resource 181 such as a DHCP (Dynamic Host Configuration Protocol) server. Core network H-123 further includes unified data management (UDM) 145-H, authentication function AUSF 144-H and home policy control function H-PCF 146-H.

Note that the allocation management resource 181 can be located at any suitable location such as inside or outside of the home wireless network 102.

In further examples, a respective Access and Mobility Management Function (AMF) is a control plane (CP) function. The AMF uses different interfaces to communicate with the other network functions or nodes. For example, the N11 interface exists between the AMF and Session Management Function (SMF).

A respective Session Management Function (SMF) is an element of the wireless Service-Based Architecture (SBA). The SMF is primarily responsible for interacting with the decoupled data plane, creating updating and removing Protocol Data Unit (PDU) sessions and managing session context with the User Plane Function (UPF). etc.

A respective User Plane Function (UPF) is a function that does all of the work to connect the actual data coming over the Radio Access Network (RAN) to the Internet. Being able to quickly and accurately route packets to the correct destination on the Internet is the key to improving efficiency and user satisfaction.

A respective Policy Control Function (PCF) support QoS (Quality of Service) policies and charging control functions and the related wireless signaling interfaces.

A respective Authentication Server Function (AUSF) is typically in a home network and performs authentication with user equipment (a.k.a., mobile communication device 121). The AUSF makes the decision on UE authentication, but it relies on backend service for computing the authentication data and keying materials.

A respective UDM network function (Unified Data Management further comprising) supports different major functionalities in 5G. The respective UDM generates authentication credentials used during the authentication process. It authorizes network access and roaming based on user subscriptions.

Note that each of the functions can be implemented in any suitable manner. For example, each communication management resource can be implemented as communication management hardware, communication management software, or a combination of communication management hardware and communication management software; wireless access point 131 can be implemented as wireless access point hardware, wireless access point software, or a combination of wireless access point hardware and software; and so on.

Note that the network 190 or network 199 can be and/or include any suitable type of network supporting wireless communications between communication device 121 and one or more resources associated with network 199. For example, network 190 and/or network 199 can be and/or include a phone network, wireless network, wired network, cellular phone network, Internet, local area network, public switched telephone network, etc.

The following textual description describes functionality supported by communication device 121 and any of multiple different communication management resources in network environment 100. Note that each of the other communication devices in communication system 100 can provide similar functionality for each of the different users. Also, note that the visited wireless network 101 and corresponding components are controlled by the wireless network service provider 171; the home wireless network 102 and corresponding components are controlled by the wireless network service provider 172.

Figure 2:
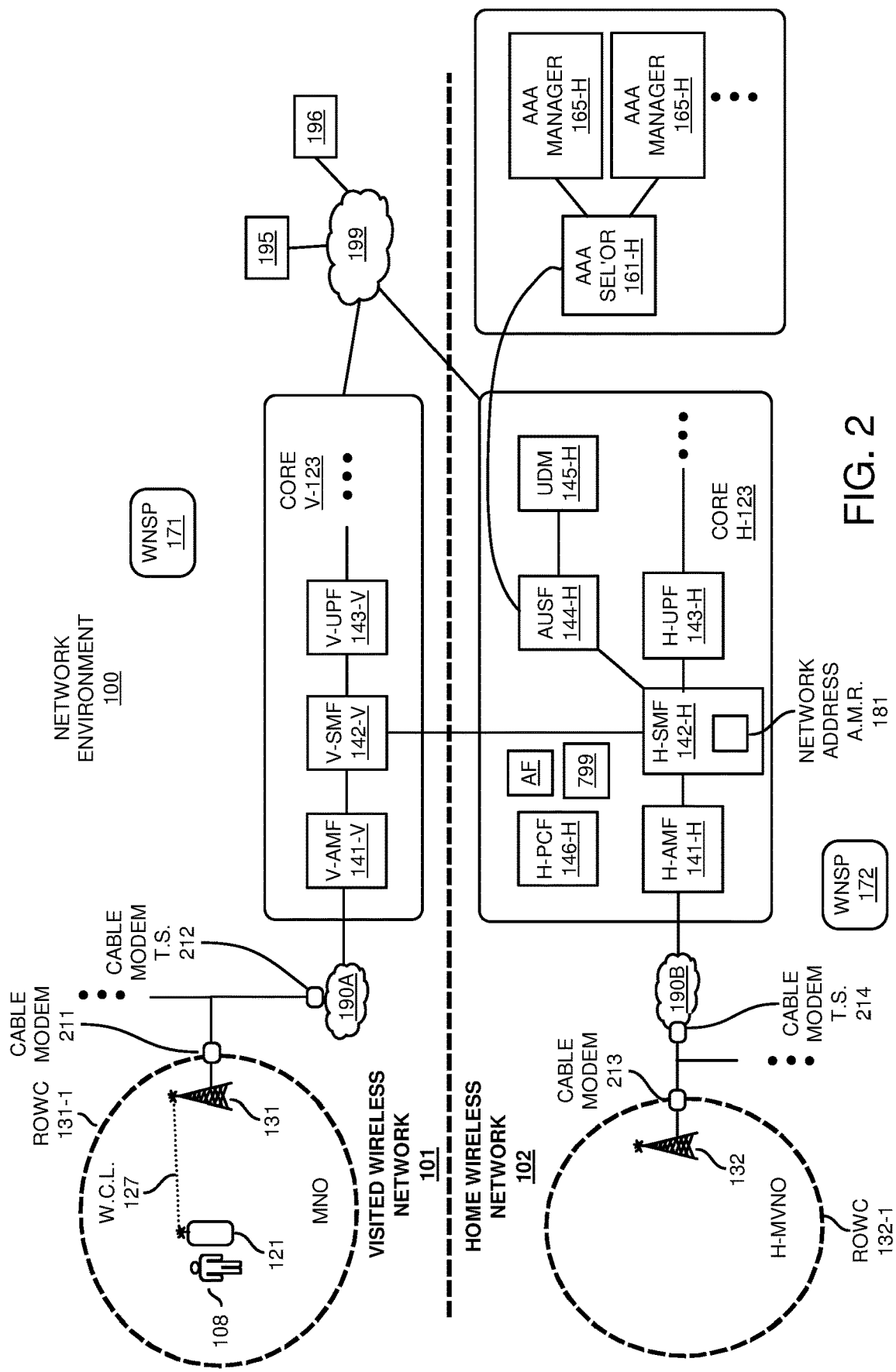
FIG. 2 is an example diagram illustrating a network environment including implementation of a cable modem equipment and cable modem termination system providing connectivity to a first wireless network and second wireless network as discussed herein.

FIG. 2 is an example diagram illustrating a network environment including implementation of a cable modem equipment and cable modem termination equipment providing connectivity to a first wireless network and second wireless network as discussed herein.

In this example, the wireless access point 131 is provided connectivity to the core network V-123 via cable modem 211 and cable modem termination system 212. The wireless access point 132 is provided connectivity to the core network H-123 via cable modem 213 and cable modem termination system 214.

Figure 3:
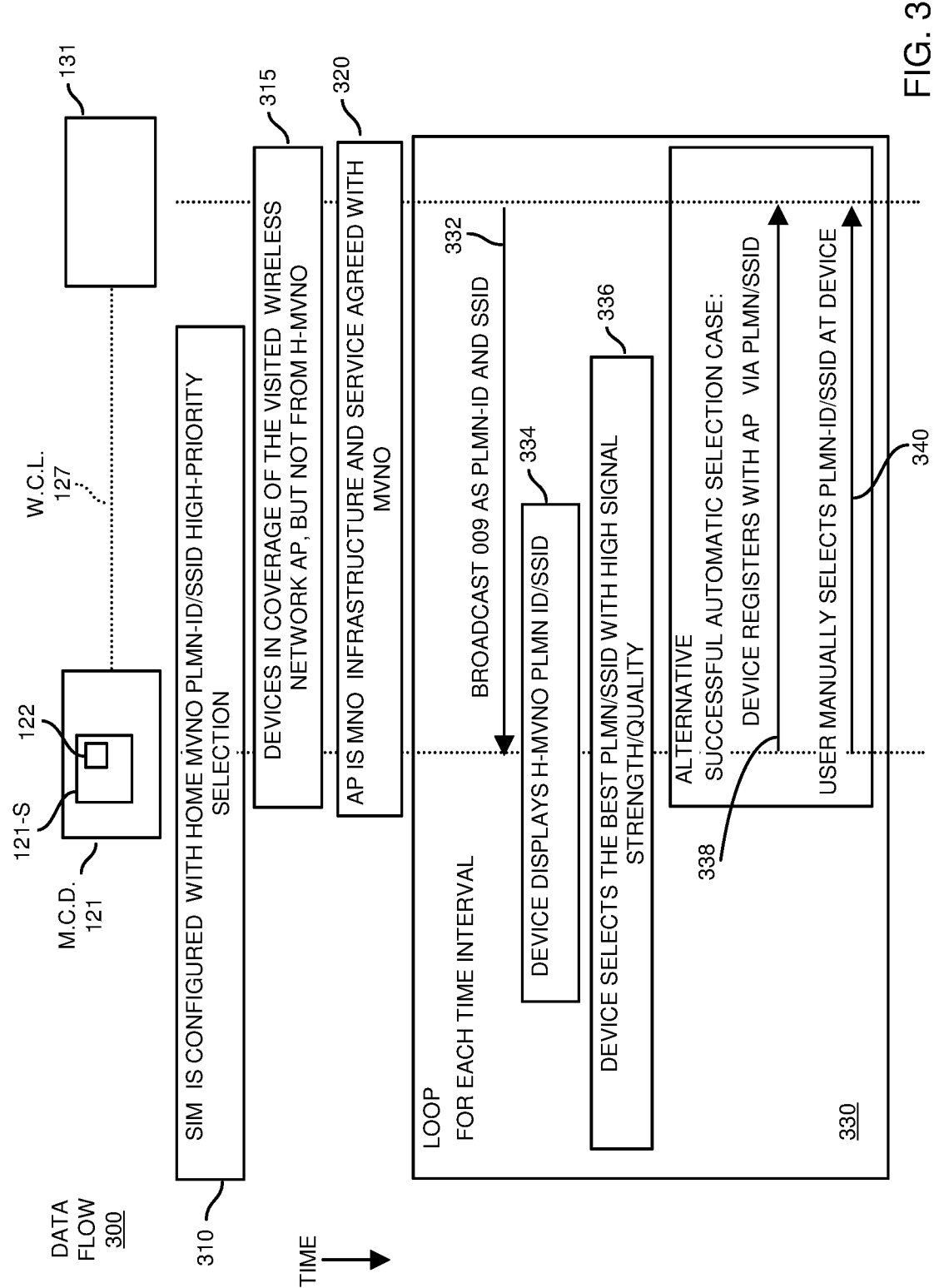
FIG. 3 is an example flow diagram illustrating a technique of providing notification of available wireless networks to a mobile communication device as discussed herein

FIG. 3 is an example flow diagram illustrating a technique of providing notification of available wireless networks to a mobile communication device as discussed herein.

In data flow 300, as further discussed below, the wireless access point 131 associated with the visited wireless network 101 broadcasts a virtual RAN (Radio Access Network) identity value 009, which is shared among all participating wireless network service providers (operators).

More specifically, the mobile communication device 121 includes subscriber identity module information 121-S. As shown in state 310, the subscriber identity module information 121-S or other suitable entity in the mobile communication device 121 is configured to include a wireless network selection list 122, which is configured by the wireless network service provider 172 (such as MVNO operator) associated with home wireless network 102 to include the home wireless network's (PLMN-Id, SSID) at the top of the wireless network selection list 122 (highest priority).

The mobile communication device 121 uses the wireless network selection list 122 as a basis in which to determine which of multiple wireless networks to wirelessly connect when requesting wireless services. Because the identity of the home wireless network 102 is at the highest priority level in the wireless network selection list 122, this ensures that the mobile communication device 121 selects and attempts to connect to the home wireless network 102 (such as wireless access point 132 or other wireless access point of the home wireless network 102 if available) when the mobile communication device 121 is requesting wireless connectivity (data or voice) to a remote network 199 (such as the Internet, phone or voice network, etc.). If the home wireless network 102 and corresponding wireless access points 132 are not available to the mobile communication device 121 at the current location of the mobile communication device 121 because the mobile communication device 121 is out of range of the home wireless network 102 (such as the mobile communication device 121 being in the region of wireless coverage 132-1), the mobile communication device 121 may be able to connect to a visited wireless network 101 to be provided wireless connectivity services.

In this example, as shown in state 315, assume that the mobile communication device 121 resides in the region of wireless coverage 131-1 and is unable to connect to the home wireless network 102 via corresponding one or more wireless access points 132 associated with the home wireless network 102. The mobile communication device 121 resides in region of wireless coverage 131-1, meaning that the mobile communication device 121 can receive wireless services from partner wireless network service provider 171 operating (controlling) and corresponding visited wireless network 101.

State 320 indicates the agreed wireless network service sharing between the first wireless network service provider 171 and the second nanosphere particle 172. For example, the service agreement allows subscriber (user 108) of the home wireless network 102 to use wireless connectivity resources associated with the visited wireless network 101 as further discussed below.

Note further that the visited wireless network 101 (a.k.a., as visiting wireless network) can be configured to create a Participating Operator neutral network identity value (e.g. SSID or PLMN Identity value=009). Note that PLMN is the abbreviation of Public Land. Mobile Network: it refers to the network that provides land mobile telecommunication services to the public. The PLMN ID is a series of numbers that identifies a specific network. It can be configured to include Mobile Country Code (MCC) and Mobile Network Code (MNC).

In such an instance, as further shown in loop 330, the wireless access point 131 (such as wireless base station, gNodeB, etc.) can be configured to broadcast communications 332 including a network identity value of "009" or other suitable value to provide notification of its RAN (Radio Access Network) services to all mobile communication devices in region of wireless coverage 131-1 listening for beacons of available wireless access points. The mobile communication device 121 receives the communications 332 and identity value 009. As previously discussed, the broadcasted identity value "009" can be an agreed upon neutral network from all Participating Operators (such as wireless network service provider 171, wireless network service provider 172, etc.) sharing use of wireless networks with each other.

As previously discussed, the mobile communication device 121 receives the wirelessly transmitted identity value "009" via communications 332 over the wireless communication link 127. The mobile communication device 121 can be configured to display a respective notification on a display screen of the mobile communication device 121 indicating that wireless services (of the visited wireless network 101) are available to the mobile communication device 121 and corresponding user 108 subscriber of home wireless network 102).

If desired, via processing operation 334, the notification is displayed on the mobile communication device 121; the notification can be configured to indicate that the wireless access point 131 (transmitting the wireless communications 332 and value 009) is part of or related to the home wireless network 102 (such as associated with the wireless network service provider 172), even though the wireless access point 131 providing wireless services is actually part of the visited wireless network 101 (provided by wireless network service provider 172).

Thus, in processing operation 334, the received identity value 009 will cause the mobile communication device 121 to display its own home wireless network (identity of wireless network service provider 172 or H-MVNO) as being available, not as an MNO network (e.g., wireless network service provider 171 or visited wireless network 101) for the received identity value "009" from wireless access point 131. This function of providing notification that the home wireless network is available (as a home wireless network function) even though the available wireless network is the visited wireless network 101 is based on a service agreement between the wireless network service provider 172 and the wireless network service provider 171 that the visited wireless network 101 can be utilized to provide wireless access as the MVNO's network access and present this network to the user's device as available H-MVNO connectivity.

Note that the mobile communication device 121 may receive notices of communications 332 from multiple different wireless access points operated by the wireless network service provider 101. In processing operation 336, the mobile communication device 121 determines a signal strength/quality of receiving wireless communications from each of multiple wireless access points operated by the wireless network service provider 171 and selects a best wireless access point amongst those wireless access points that provides the highest signal strength/wireless link quality as well as one that is highest on the select list 122.

Thus, in one example, the wireless network service provider 172 is the MVNO (Mobile Virtual Network Operator) operator and this is the home wireless network 102 to which a user 108 of the mobile communication device 121 subscribes. When the mobile communication device 121 is outside of the home wireless network 102 and corresponding wireless coverage provided by one or more wireless access points 132, the visiting wireless network 101 in view of the MVNO-MNO agreement will be considered as a home wireless network based on the "009" operator neutral PLMN identity previously sent to the mobile communication device 121 in communications 332.

In response to receiving the communications 332 and selection of a wireless access point 131, via communications 338, the mobile communication device 121 selects and registers with the wireless access point 131 assigned the PLMN-Identity value/SSID 009 as received in the communications 332. Alternatively, via communications 340, note that the user 108 of the mobile communication device 121 may initiate manual registration of the mobile communication device 121 with the wireless access point 131 assigned the PLMN-Identity value/SSID 009 as received in the communications 332. Thus, in either case, the value 009 indicates that the mobile communication device can use a wireless network and corresponding one or more wireless access points associated with visited wireless network 101.

Figure 4:
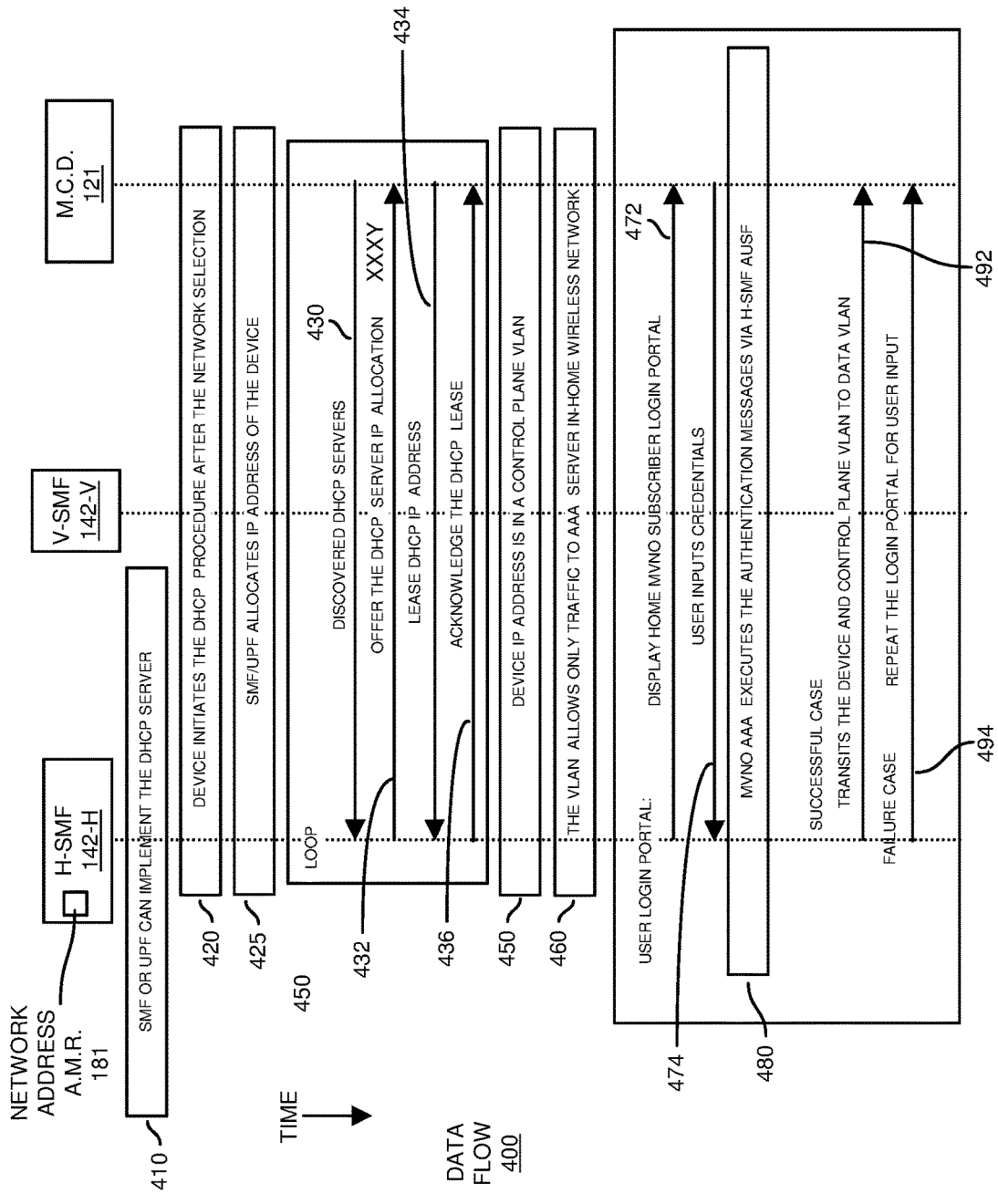
FIG. 4 is an example flow diagram illustrating authentication of a mobile communication device via communications through a visited wireless network to a home wireless network as discussed herein.

FIG. 4 is an example flow diagram illustrating authentication of a mobile communication device via communications through a visited wireless network to a home wireless network as discussed herein.

In the further examples of data flow 400 in FIG. 4, the visited wireless network 101 provides a VLAN for the mobile communication device 121 and device authentication with the home network AAA server through a connectivity provided by the visited wireless network 101 from the wireless access point 131 through the V-SMF 142-V to the H-SMF and corresponding network address allocation management resource 181 (such as a DHCP server, or Dynamic Host Control Protocol server that allocates network addresses for use by communication devices).

For the connectivity between visited wireless network 101 and the mobile communication device 121, the visited wireless network 101 provides a DHCP service to all devices trying to connect to wireless access point assigned "009".

Note that the network address allocation management resource 181 (such as DHCP server) can be implemented in the H-SMF and/or in H-UPF or other suitable entity. The IP address allocation to the mobile communication device 121 can be configured to happen within a subnetwork under strict control. For example, the temporary subnetwork as further discussed below allows only control plane traffic between the mobile communication device 121 and the destination node (network address allocation management resource 181) and AAA server. No user plane traffic is allowed.

The subnetwork is only for network management traffic. The connectivity is between the mobile communication device 121 and the NMS (Network Management System) in the MVNO core node in the home wireless network 102 of this device.

The connectivity is strict between mobile communication device 121/radio access node/V-AMF/V-SMF/H-SMF/AUSF/AAA and . . . /H-SMF/NMS As further discussed herein, the mobile communication device 121 uses the connectivity (such as communication path connectivity from mobile communication device 121 over wireless communication link 127, through network 190A, wireless access point 131, V-AMF 141-V, V-SMF 142-V to H-SMF 142-H in home network environment 102) to authenticate a subscription of the mobile communication device 121 and corresponding user 108 with the home network environment 102.

More specifically, as shown via data flow 400, the state 410 indicates that the H-SMF 142-H or H-UPF 143-H or other suitable entity can be configured to implement the network address allocation management resource 121.

The state 420 indicates that the mobile communication device 121 initiates the DHCP procedure for allocation of a respective network address (such as a DHCP procedure) after selecting the use of the wireless access point 131 and corresponding visited wireless network 101 to establish a respective wireless communication link.

The state 425 indicates that the network address allocation management resource 181 allocates a respective IP address to the mobile communication device 121 in accordance with the following operations.

For example, the communications 430 are transmitted from the mobile communication device 121 over the established communication path connectivity (as previously discussed) to the network address management resource 181. The communication device 121 transmits the communications 430 to discover any available DHCP servers associated with the home wireless network 102.

In response to receiving communications 430, via communications 432 transmitted over the established communication paths connectivity from the network address allocation management resource 181, the network address allocation management resource 181 provides notice of a respective network address XXXY assigned for use by the mobile communication device 121.

In response to receiving the communications 432 and corresponding network address XXXY (such as an Input port or Internet Protocol network address), the mobile communication device 121 transmits communications 434 over the established communication paths and connectivity to the network address allocation management resource 181 in home network environment 102. The communications 434 indicate that the mobile communication device 121 accepts leasing of the network address XXXY.

In response to receiving communications 434, via communications 436 transmitted over the established communication paths and connectivity (through the V-SMF 142-V and V-AMF 141-V and network 190A) from the network address allocation management resource 181 to the mobile communication device 121, the network address allocation management resource 181 provides notice of acknowledging leasing of the respective network address XXXY to the mobile communication device 121.

As further shown, state 450 indicates that the allocated network address XXXY is available to support communications in a respective control plane of the VLAN over which the mobile communication device 121 is able to communicate over the established communication paths and connectivity as well as over connectivity between the H-SMF 142-H and AUSF 144-H to the AAA selector 161-H and one or more appropriate AAA managers 165-H, 166-H, etc.

As further shown by state 460, the control plane VLAN allows only traffic between the mobile communication device 121 and the appropriate AAA server (such as AAA selector 161-H and AAA manager 165-H) in the home wireless network 102. As further discussed herein, the traffic over the control plane VLAN supports authentication of the mobile communication device 121 by the home wireless network 102 and corresponding authentication server.

Via communications 472 (over the VLAN) from the H-SMF 142-H over the established communication path connectivity to the mobile communication device 121, the H-SMF 142-H causes display of the respective home wireless network log portal to be displayed on a display screen of the mobile communication device 121. The user 108 or executed function of the mobile communication device 121 enters/supplies appropriate credentials to use the home wireless network 102 and corresponding wireless services.

Via communications 474 (over the control plane VLAN) from the mobile communication device 121 over the established communication path connectivity to the H-SMF 142-H, the H-SMF 142-H receives credentials supplied by the corresponding user 108 and mobile communication device 121. Assume that the AAA manager 165-H is selected to authenticate the mobile communication device 121 and the corresponding user 108. In such an instance, as shown in operation 480, the AAA manager 165-H uses the received credentials supplied by the mobile communication device 121 and corresponding user 108 to detect that the mobile communication device 121 and corresponding user 108 are authorized to use the visiting wireless network 101 and corresponding wireless services because of a respective agreement between the wireless network service provider 172 and the wireless network service provider 171.

Assuming that the AAA manager 165-H detects that the mobile communication device 121 and corresponding user 108 are successfully authenticated, the AAA manager 165-H provides notification to the H-SMF 142-H of the successful authentication. In response to detecting this condition, via communications 492, the H-SMF 142-H provides notification of same and/or transitions the mobile communication device 121 from the using the control plane VLAN to a data plane VLAN.

Note that if there is a failure of authenticating the mobile communication device 121 and corresponding user 108, the H-SMF 142-H in the home wireless network 102 provides a respective notification via communications 494 over the established communication paths and connectivity to the mobile communication device 121 notifying the mobile communication device 121 to repeat the login portal procedure for the user 108.

In further examples, note that the AMF (access and mobility management function) or W-AGF (5G Access Gateway Function) can be configured to discover the AUSF (authentication server function) and AAA server based on the home network identifier (i.e., realm part) and the routing indicator in the SUCI (subscription concealed identifier) provided by the mobile communication device 121.

The home network identifier (e.g. spectrum.net or in the mobile network the PLMN the MCC/MNC) and the routing indicator (e.g. 1234 representing the corresponding the core node in Spectrum Mobile networks in which the UDM contains the device subscription data) are used to select the AUSF (in Spectrum Mobile).

The diagram-arch illustrates the architecture used for the procedure.

When the AUSF in the H-MVNO (home wireless network 102) authenticates/authorizes the device using the credentials from an AAA Server in a H-MVNO node, the SUPI (subscription permanent identifier) is used to identify the device towards the AAA server.

The device subscription data is retrieved from the UDM using the SUPI.

When the UDM decides that the primary authentication is performed by the AAA Server in the H-MVNO cloud based on the UE subscription data and UE's SUPI, the UDM instructs the AUSF to discover and select the Selector (AAA selector function), and then forward EAP messages (extensible authentication protocol) to the AAA-selector.

The AAA-selector selects the AAA Server based on the domain name corresponding to the realm part of the SUPT.

The provisioning of 3rd party credentials can be implemented within AAA-selector 161-H or other suitable entity in addition to the H-MVNO AAA cloud servers.

This secondary authentication method allows an external 3rd party AAA server to be selected instead one from H-MVNO cloud.

The diagram-arch can be extended with an AAA-server outside the box H-MVNO AAA Cloud.

Figure 5:
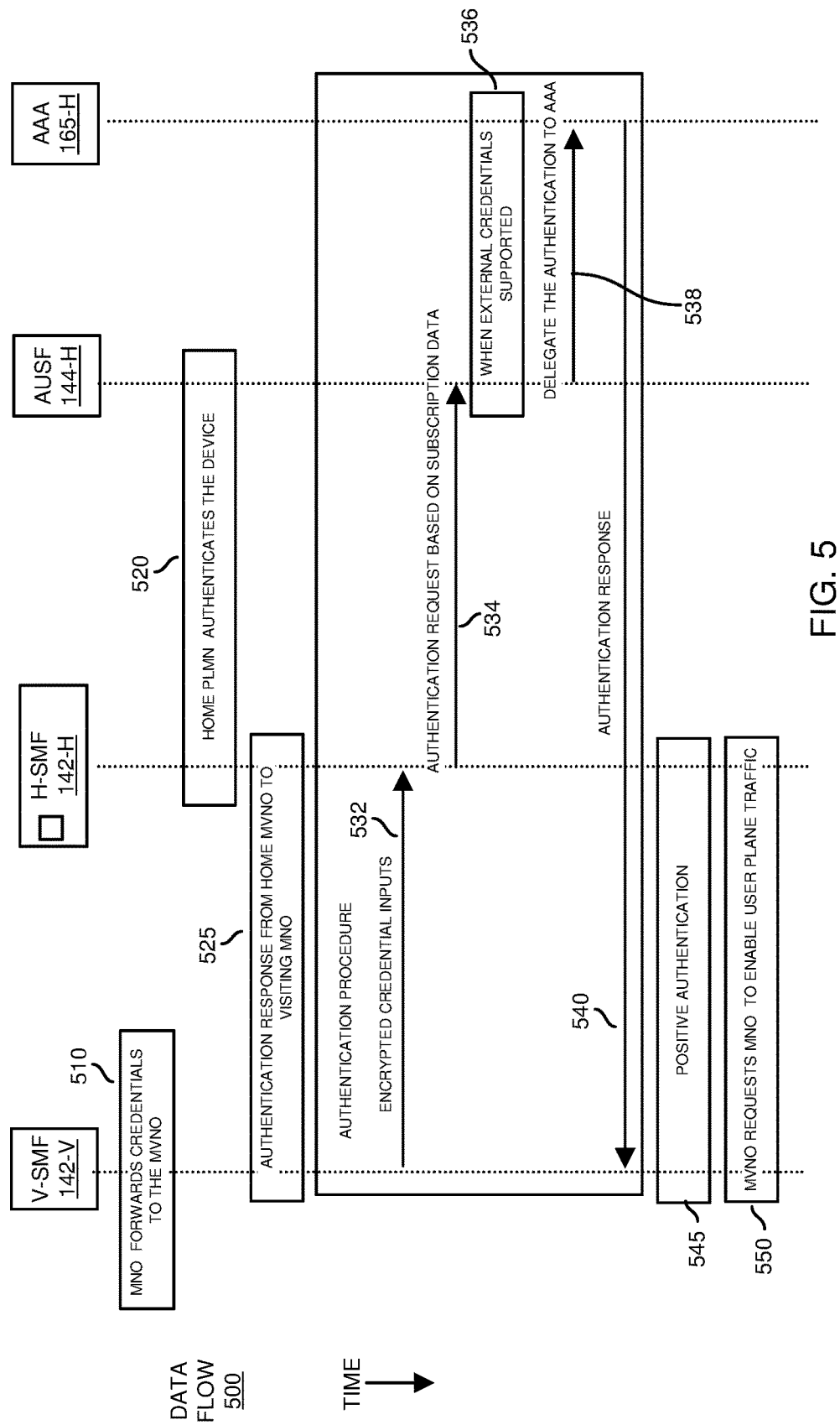
FIG. 5 is an example flow diagram illustrating authentication of a mobile communication device via communications through a visited wireless network to a home wireless network as discussed herein.

FIG. 5 (FLOW 5) is an example flow diagram illustrating authentication of a mobile communication device via communications through a visited wireless network to a home wireless network as discussed herein.

In state 510, the visited wireless network 101 forwards credentials associated with the mobile communication device 121 to the home wireless network 102 in order to authenticate the mobile communication device 121 and/or corresponding user 108 with the home wireless network 102 and subsequent use of the visited wireless network 101 by the user 108 and corresponding mobile communication device 121.

As further shown, in state 520, the home wireless network (PLMN) authenticates the mobile communication device 121 and/or corresponding user 108.

In state 525, the home wireless network 102 provides a respective authentication response (such as successful authentication notification or unsuccessful authentication notification of the respective mobile communication device 121) to the V-SMF 142-V of the visited wireless network 101.

More specifically, in this example, the V-SMF 142-V transmits communications 532 such as including decrypted credentials (such as password, identity information, username, etc.) supplied by the user 108 and/or mobile communication device 121 to the H-SMF 142-H.

The H-SMF 142-H transmits communications 534 such as including an authentication request based on the received subscription data and the credentials (such as password, identity information, username, etc.) supplied by the user 108 and/or mobile communication device 121 to the AUSF 144-H.

In state 536, when verification of extra credentials is supported, the AUSF 144-H delegates authentication of the mobile communication device 121 and/or user 108 to the AAA manager 165-H via communications 538. This can include communicating any suitable information such as subscription data, the credentials (such as password, identity information, username, etc.) supplied by the user 108 and/or mobile communication device 121, to the AAA manager 165-H (i.e., authentication manager) that authenticates the mobile communication device 121 for use in the visited wireless network 101.

In state 545, the H-SMF 142-H supplies notification of successful authentication of the mobile communication device 121 and/or the user 108 with respect to the home wireless network 102.

In state 550, the H-SMF 142-H in the home wireless network 102 communicates one or more messages to the V-SMF 142-V requesting the visited wireless network 101 to enable user plane traffic, allowing the mobile communication device 121 to communicate over a communication path between the mobile communication device 121 over wireless communication link 127, through network 190 and core V-123 to the network 199 and corresponding entities such as servers 195, mobile communication devices 196, etc.

More specifically, after a successful authentication of the mobile communication device 121 via the AAA server (AAA manager 165-H) in data flow 500 of FIG. 5, in state 550, the home wireless network 102 (such as MVNO) signals the MNO core node (such as V-SMF 142-V or other suitable entity) in the visited wireless network 101 to switchover the mobile communication device 121 into a user traffic mode allowing the mobile communication device 121 wireless access to any entities through core V-123 and/or core H-123 to the remote network 199 and corresponding entities coupled to it such as servers 195, cell phones 196, etc. In this mode, the mobile communication device 121 is allowed to transmit and receive all different types of traffic in both the uplink and downlink directions over wireless communication link 127.

Further, the MVNO of home wireless network 102 such as AAA/AUSF (such as AAA manager 165-H and/or AUSF 144-H) informs the H-SMF 142-H of the authentication results of authenticating the mobile communication device 121.

If authentication of the mobile communication device 121 is successful, then the H-SMF 142-H communicates a message to the V-SMF 142-V to start a user traffic mode in which the user 108 and corresponding mobile communication device 121 are provided wireless access to any remote entities through the visited wireless network 101 and corresponding resources. Thus, because the mobile communication device 121 is only able to use the home wireless network 102 and corresponding resources, the mobile communication device uses wireless network services provided by the visited wireless network 101.

On the other hand, if the authentication of the mobile communication device 121 is unsuccessful, then H-SMF 142-H counts the status of the failure. Based on an MVNO control policy associated with home wireless network 102, after reaching a specific count threshold, the H-SMF 142-H sends a message to the V-SMF 142-V to stop the virtual RAN connectivity associated with the mobile communication device 121 because the mobile communication device 121 and/or user 108 failed to authenticate itself.

When the V-SMF 142-V receives the notification message to start the user traffic mode for the mobile communication device 121, the MCP server (such as network address allocation management resource 181 terminates the previously leased IP address XXXY such as immediately or any suitable time. The network address allocation management resource 181 now starts a process of assigning the mobile communication device 121 use of the visited wireless network 101 via another subnetwork "data plane" IP allocation.

The "data plane" subnetwork allocation in the visited wireless network 101 allows the mobile communication device 121 to all UL/DL destinations. For example, the corresponding subnetwork in the visited wireless network 102 supports data traffic on behalf of the mobile communication device 121 through the V-SMF 142-V/V-UPF 143-V and H-SMF 142-H/H-UPF 143-H.

As further discussed below, note that the data plane QoS flow (data through visited wireless network 101) associated with the mobile communication device 121 is then controlled by the PCF (policy control function) received from the home MVNO. In other words, as further discussed herein, the visited wireless network 101 can be configured to receive one or more respective data flow policies from the home wireless network 102. The visited wireless network 101 (and specifically core network V-123) implements the received data flow policies and applies them to control respective flows of data traffic between the mobile communication device 121 and the destination entities 195, 196, etc.

In further examples, when the UDM 145-H decides that the primary authentication is performed by a AAA Server in the H-MVNO cloud based on the UE (a.k.a., mobile communication device 121) subscription data and UE's SUPT, the UDM 145-H instructs the AUSF 144-H to discover and select the Selector (AAA selector 161-H), and then forward EAP messages (extensible authentication protocol) to the AAA-selector 161-H.

The AAA-selector 161-H selects from the different AAA managers 165-1, 165-2, etc., (AAA Servers) based on the domain name corresponding to the realm part of the SUPT.

Note further that the provisioning of 3rd party credentials can be implemented within AAA-selector 161-H in addition to the AAA cloud servers of the home network environment 102 operated by the wireless network service provider 172.

This secondary authentication method allows an external 3rd party AAA server to be selected instead a AAA server from the H-MVNO cloud (i.e., home network environment 102.

The diagram-arch can be configured to extend with an AAA-server outside the box H-MVNO AAA Cloud.

Figure 6:
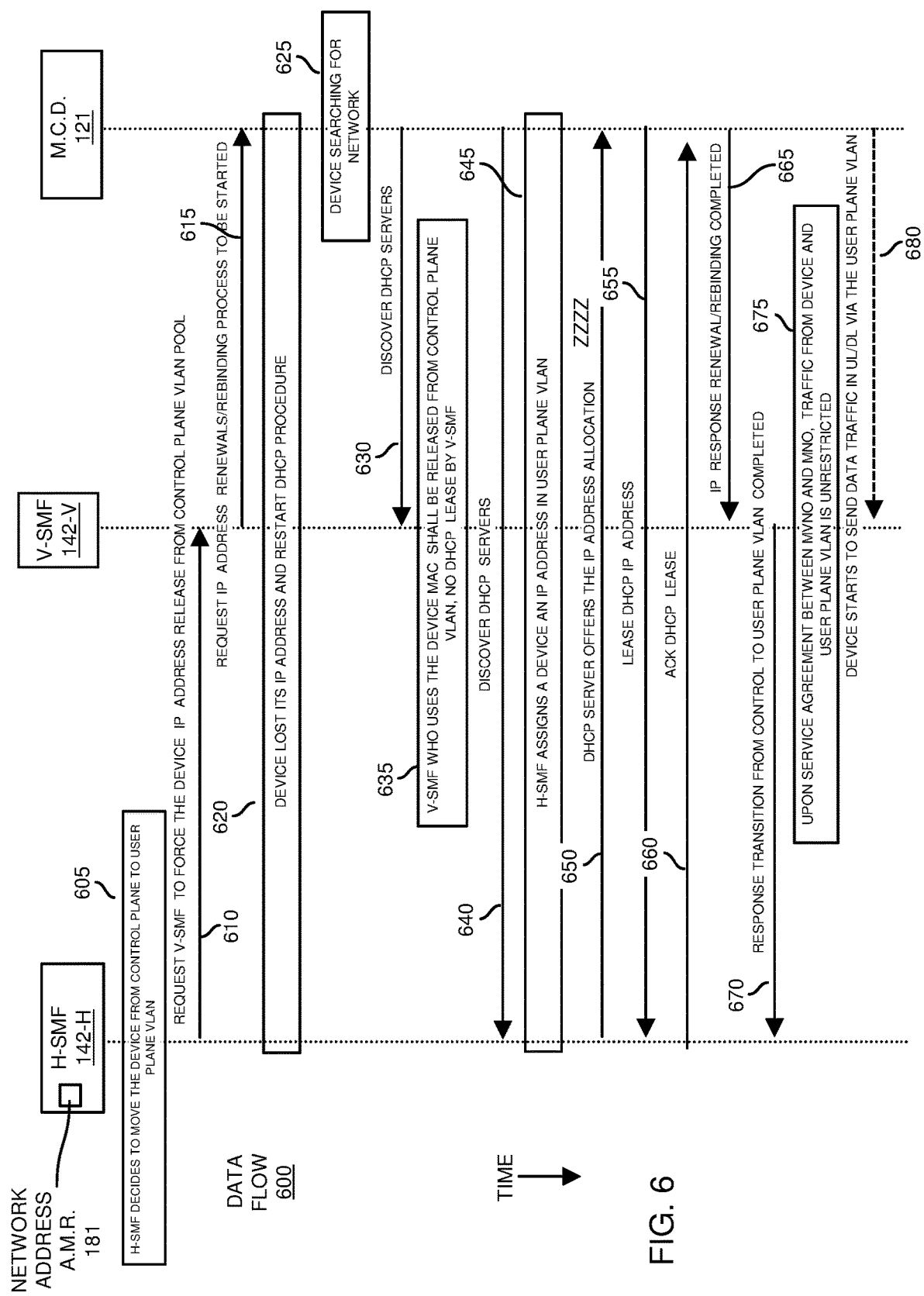
FIG. 6 is an example flow diagram illustrating transition of a mobile communication device from a control plane to a user plane as described herein.

FIG. 6 is an example flow diagram illustrating transition of a mobile communication device from a control plane (supporting authentication through the visited wireless network 101 to the home wireless network 102) to a user plane (through the visited wireless network 101) as described herein.

At state 605, the home wireless network 102 decides to move the mobile communication device 121 and the previously used control plane to the user plane VLAN.

Via communications 610 from the H-SMF 142-H to the V-SMF 142-V, the H-SMF 142-H communicates a request that forces the previously allocated device IP address XXXY to be released from the control plane VLAN pool.

The V-SMF 142-V transmits communications 615 to the mobile communication device 127. The communications 615 can be configured to include a request for IP address renewal and a rebinding process to be started.

At state 620, the mobile communication device 121 terminates use of the prior IP address XXXY (such as releases the network address XXXY back to a respective IP network address pool of network address allocation management resource 181) and restarts the DHCP procedure to obtain a respective new IP network address supporting communications through the visited wireless network 101.

In state 625, the mobile communication device 121 searches for a network.

The communication 630 transmitted from the mobile communication device 121 to the V-SMF 142-B, the mobile communication device 121 discovers availability of different DHCP servers in which to obtain a new IP network address.

In state 635, the V-SMF 142-V provides notification that the device MAC address of the mobile communication device 121 will be released from the control plane VLAN and that there is no DHCP lease of a network address by the V-SMF 142-V to the mobile communication device 121.

Via communications 640 from the mobile communication device through the V-SMF 142-V to the H-SMF 142-H, the mobile communication device 121 discovers one or more available network address allocation management resources (such as DHCP servers) available to allocate one or more network addresses.

In state 645, the H-SMF 142-H assigns the mobile communication device 121 for use in the user plane VLAN.

Via communications 650 from the network address allocation management resource 181 in the H-SMF 142-H through the V-SMF 142-V to the mobile communication device 121, the H-SMF 142-H provides notification of an IP network address (ZZZZ) offer. Assume that the offer includes provisioning or assignment of IP network address ZZZZ for use by the mobile communication device 121 to use the visited wireless network 101.

Via communications 655, the mobile communication device 121 provides notification of acceptance of the IP network address ZZZZ assignment/allocation.

Via communications 660, the network address allocation management resource 181 at the H-SMF 142-H provides notification or acknowledgment of the DHCP lease of IP network address ZZZZ to the mobile communication device 121.

Via further communications 665 from the mobile communication device 121 to the V-SMF 142-V, the communication device 121 provides notification of renewal of the IP address to the V-SMF 142-V. The communication 665 can be configured to further indicate that rebinding is completed and that the mobile communication device 121 is now ready to support connectivity of the mobile communication mice 121 to the remote network 199.

Via communications 670 from the V-SMF 142-V to the H-SMF 142-H, the V-SMF 142-V provides notification of the transition of the mobile communication device 121 from the control plane to the user plane VLAN and that such transition is completed.

In state 675, in accordance with a service agreement between the wireless network service provider 172 and the wireless network service provider 171, the wireless visited wireless network 101 supports unrestricted flow of traffic from the mobile communication device 121 and the user plane VLAN implemented in the core 123-V of the visited wireless network 101 to network 199.

Via communications 680, the mobile communication device 121 uses the assigned IP network address ZZZZ to support uplink and downlink data traffic in the user plane VLAN (such including communications over wireless communication link, through a combination of wireless access point 131, network 190A, and core V-123 to the network 199) implemented by the visited wireless network 101.

Figure 7:
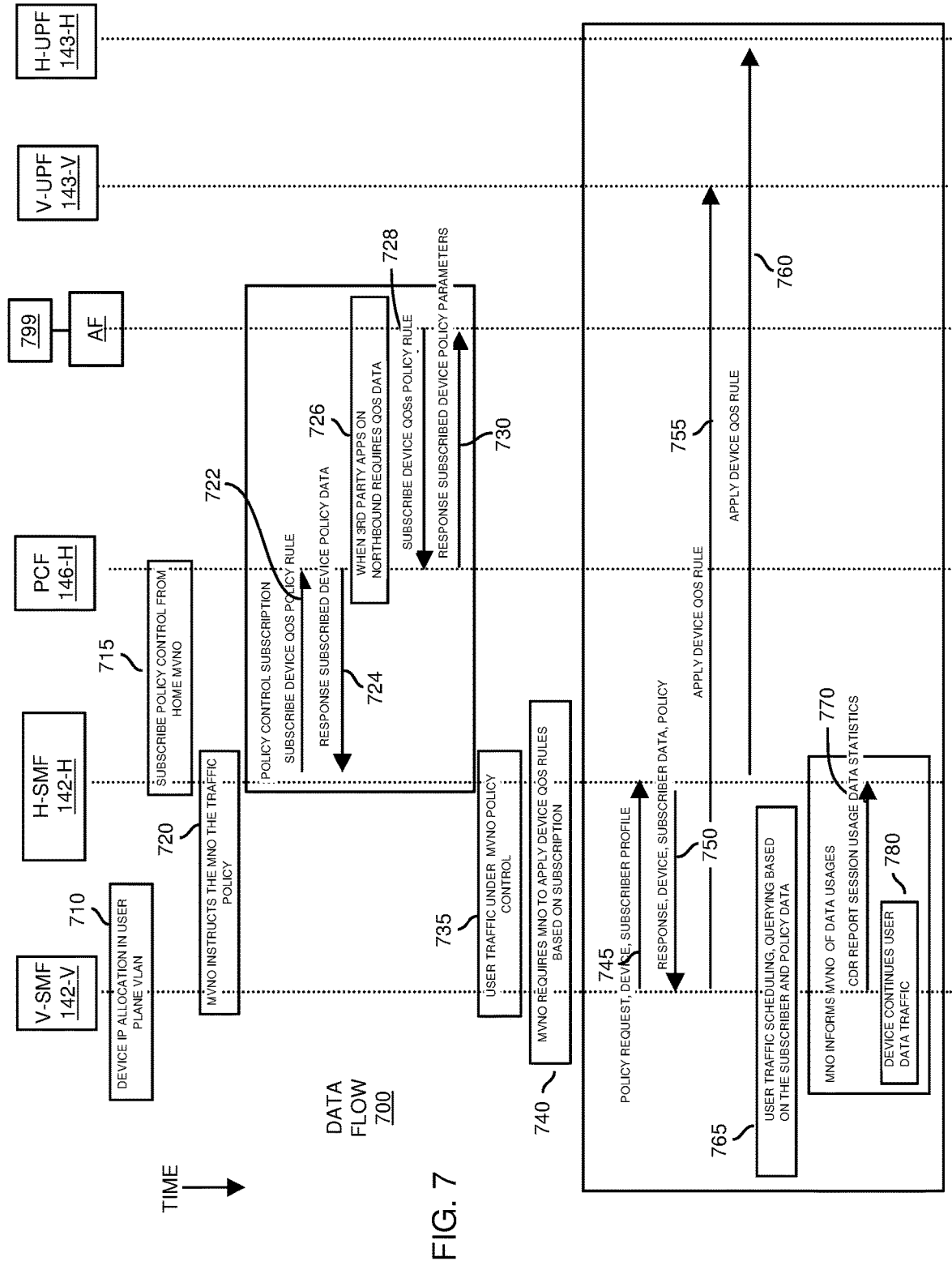
FIG. 7 is an example flow diagram illustrating a visited network applying a data traffic control policy as received from a home network to a mobile communication device as described herein.

FIG. 7 is an example flow diagram (data flow 700) illustrating a visited network implementing data traffic control as described herein.

In state 710, the V-SMF 142-V acknowledges allocation of IP network address ZZZZ to support the user plane VLAN in the visited wireless network 101.

In state 715, the H-SMF and the H-PCF 146-H (a.k.a., Policy Control Function) of the home wireless network 102 obtain appropriate policy control information from the home wireless network 102. This can include, via the H-PCF 146-H, mapping an identity of the mobile communication device 121 and/or the corresponding user 108 to corresponding data flow control policy information assigned to the user 108 and the corresponding mobile communication device 121.

In state 720, the home network home wireless network 102 instructs the visitor wireless network 101 of the corresponding policy information including one or more data traffic policies in which to apply to respective data flows of communications conveyed in the visited wireless network 101 between the mobile communication device 121 and the remote network 199 and corresponding entities such as 195, 196, etc.

For example, via communication 722 from the H-SMF 142-H to the policy control function H-PCF 146-H, the H-SMF 142-H subscribes the quality of service policy rules of a device from the policy control function 146-H.

Via communications 724 from the policy control function 146-H to the H-SMF 142-H, the policy control function 146-H response is to provide the device policy data of the device subscribed by the communications 722.

In state 726, it is determined that a third-party application associated with the mobile communication device 121 requires the quality of service data, an access function AF and policy control information 799 subscribe the quality of service data of a mobile communication device 121 from the H-PCF 146-H.

Via communications 728 from the application function AF to the policy control function 146-H, the application function AF provides notification of one or more quality of service policy rules (policy control information 799) associated with (assigned to) the mobile communication device 121.

Via communications 730, the policy control function 146-H provides a response to the communication 728 including policy parameters (policy control information 799) to apply to data flows (associated with the mobile communication device 121) through the visited wireless network 101.

In state 735, the user traffic (data flows a mobile communication device 121 and user 108 in visited wireless network 101) is now under the control of the policy control information 799 provided by the home wireless network 102 to the visited wireless network 101. In other words, one or more entities in the visited wireless network 101 implement the policy control information 799 to control the different data flows associated with the mobile communication device 121.

In state 740, the home wireless network 102 requests the visited wireless network 101 to apply the provided quality of service rules (as specified by the policy control information 799) to the communications associated with the mobile communication device 121 through visited wireless network 101.

As a more specific example, via communications 745 from the V-SMF 142-V to the H-SMF 142-H, the V-SMF 142-V requests policy and subscriber profile information corresponding to the communication device 121.

The communication 750 from the H-SMF 142-H to the V-SMF 142-V, the H-SMF 142-H provides a response including device identity, subscriber information, and the corresponding policy control information 799 in which the home wireless network 101 is to apply to the corresponding data flows associated with the mobile communication device 121.

Via communication 755, from the V-SMF 142-V to the V-UPF 143-V, the V-SMF 142-V sends messages to apply policy control information 799 to the data flows associated with the mobile communication device 121 through the home wireless network 101.

Via communications 760 from the H-SMF 142-H to the H-UPF 143-H, the H-SMF 142-H sends messages to apply the policy control information 799 (that is, quality of service rules) to the H-UPF 143-H.

In state 765, the V-SMF 142-V schedules and queues and allocates buffers (controls) data traffic associated with the mobile communication device 121 over the wireless communication link 127 and through wireless network 101 based upon the policy control information 799.

Note further that via communications 770 from the V-SMF 142-V to the H-SMF 142-H, the V-SMF 142-V provides reports with respect to the visited wireless network 101 supporting data flows associated with the mobile communication device 121 and corresponding user 108.

In state 780, the V-SMF 142-V continues to provide support and tracking usage of data flows associated with mobile communication device 121 through the visited wireless network 101. The V-SMF 142-V continues to provide notification of the support tracking to the H-SMF 142-H. Accordingly, the home wireless network 102 is able to track usage of the visited wireless network 101 (and corresponding data amount associated with data flows) by the mobile communication device 121 and corresponding user 108 through the visited wireless network 101.

Thus, as discussed herein, the MVNO home H-SMF 142-H subscribes the device (121) PCF and determines the QoS flow parameters associated with the mobile communication device 121 and make use of the common policy control information 799 converted to a form of visited wireless network 101 and home wireless network 102 for the traffic control in V-SMF 142-V and H-UPF 143-H.

The MNO visiting V-SMF 142-V subscribes the device (121) H-PCF 146-H and receives the QoS flow parameters (as indicated by the policy control information 799).

The application function (AF) or the network element function (NEF) in the home network environment 102 subscribes (receives) the device policy control rules (policy control information 799) from the H-PCF 146-H in core H-123. The AF and NEF receive updates of any policy changes from the home wireless network 102. A change may be triggered by a $3^{rd}$ party service provider, from a customer portal and from a customer database.

The QoS flow parameters received by the (H-SMF 142-H or V-SMF 142-V) applies the policies to the (H-UPF 143-H and/or V-UPF 143-V) immediately after their receipt.

The H-UPF 143-H and/or V-UPF 143-V create the device data flow (a new QoS Flow Id) when there is no data flow with those QoS parameters.

Then, UPFs assign the data flow traffic (communications from the mobile communication device 121 through components of core network V-123 to the remote network 199 or communications from remote network through components of core network H-123 to the mobile communication device 121) into an appropriate data flow.

In case the visited wireless network 101 is not a 5G core and/or not a 5G core compatible node, then UPFs executes a mapping. The 5G QoS flow id is mapped to Internet differentiated service A node supports DSCP, then the PCF policy rules will map to the DSCP values according to their characteristics. A higher 5G priority value to a lower DSCP value.

A node supports PIR (peak information rate), then the GBR (Guaranteed Bit Rate) bandwidth in 5G core is mapped to average information rate. The MBR (Maximum Bit Rate) bandwidth in 5G core is mapped to peak information rate.

Case by case: If a destination node in network 199 supports a QoS class, then the V-UPF 143-V in the core network V-123 maps the data flows (data) associated with mobile communication device 127 according to the defined QoS classes.

Case by case: If a destination node in network 199 supports a set of policy, then the V-UPF 143-V maps the data flows associated with the mobile communication device 121 according to the defined policies.

Case by case: if a destination node in network 199 supports a set of shaping, then the V-UPF 143-V maps the data flows associated with the mobile communication device 121 according to the shaping definitions.

Analogy Technologies and their Differences

Diagram inter-MVNO utilizes dual-SIM dual standby set up, that means the SIM card stores both MNO and H-MVNO subscription information, when the mobile communication device 121 is in the H-MVNO coverage area, the subscription profile of the H-MVNO is used. As previously discussed, when the mobile communication device 121 moves out of the H-MVNO coverage and enters into the MNO coverage (visited wireless network 101), the mobile communication device 121 changes to use the MNO subscription information.

Embodiments herein only require a device with single subscription with the H-MVNO (home wireless network 102). The mobile communication device 121 connects with the visited wireless network 101 (e.g., wireless network service provider 171) relies on a service agreement (similar to a roaming agreement, and no need to utilize the roaming architecture/procedure). The visited wireless network 101 grants the network access based on the H-MVNO authentication procedure where the visited wireless network 101 plays a proxy/relay role. Embodiments herein define the routing solution in MNO based on SIM card stored home network identifier and routing indicator.

Background Technologies (Articles, Product, Patents)

Authentication methods focus on how the device true identity can be verified. The information exchanged between the device and the system (authentication server, public visiting and home wireless/wireline network) has to be securely encrypted and the data well protected.

Embodiments herein define how a mobile device does not need to be authenticated by the visiting network (MNO, such as a first wireless network service provider 171) but can be rely on the device's home network (H-MVNO, such as wireless network service provider 172).

The current product uses MVNO architecture that the device SIM is authenticated by the MNO network and there is no control/user plane signaling back to the H-MVNO. This does not permit the potential implementation of the features.

Utilizing individual subscription profile of customers to meet differentiated treatment, e.g. VIP level traffic service.

Dynamically adapting the service type with differentiated traffic class in which our home network intends to support, e.g. matching service flow with an on-demand QoS class.

Figure 8:
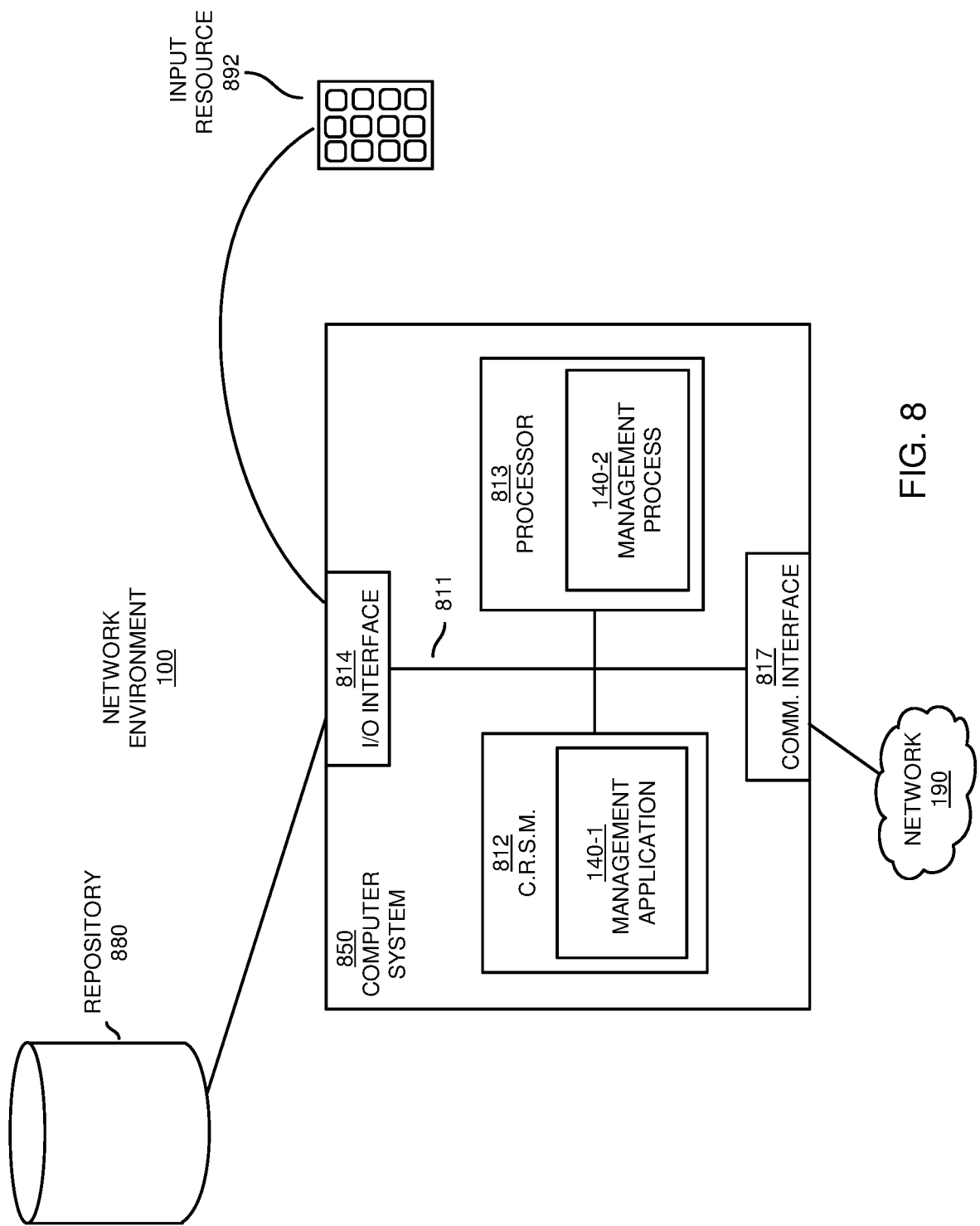
FIG. 8 is an example diagram illustrating example computer hardware and software operable to execute operations according to embodiments herein.

FIG. 8 is an example block diagram of a computer system for implementing any of the operations as previously discussed according to embodiments herein.

Note that any of the resources (such as any communication management resource, visited wireless network 101, home wireless network 102, etc.) as discussed herein can be configured to include computer processor hardware and/or corresponding executable instructions to carry out the different operations as discussed herein.

For example, as shown, computer system 850 of the present example includes interconnect 811 coupling computer readable storage media 812 such as a non-transitory type of media (which can be any suitable type of hardware storage medium in which digital information can be stored and or retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 is computer-readable storage hardware that stores instructions and/or data.

As shown, computer readable storage media 812 can be encoded with management application 140-1 (e.g., including instructions) in a respective wireless station to carry out any of the operations as discussed herein.

During operation of one embodiment, processor 813 accesses computer readable storage media 812 via the use of interconnect 811 in order to launch, run, execute, interpret or otherwise perform the instructions in management application 140-1 (function associated with a respective communication management resource) stored on computer readable storage medium 812. Execution of the notification application 140-1 (a.k.a., management application) produces management process 140-2 (a.k.a., management process) to carry out any of the operations and/or processes as discussed herein.

Those skilled in the art will understand that the computer system 850 can include other processes and/or software and hardware components, such as an operating system that controls allocation and use of hardware resources to execute the notification application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 9. Note that the steps in the flowcharts below can be executed in any suitable order.

Figure 9:
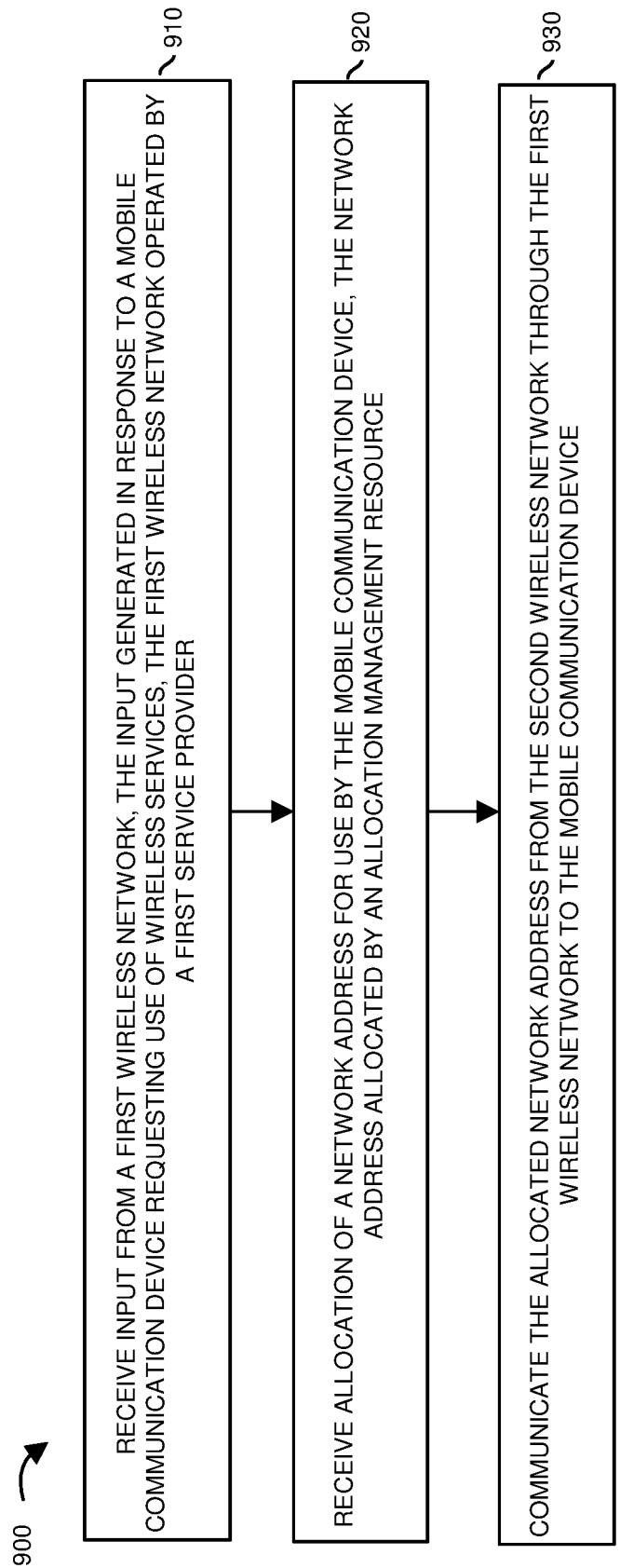
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the home wireless network 102 receives input from a visited wireless network 101. The input is generated in response to a mobile communication device 121 requesting use of wireless services by the wireless access point 131 in the visited wireless network 101. The visited wireless network 101 is operated by a first wireless network service provider 171. The home wireless network 102 is operated by a second wireless network service provider 172.

In processing operation 920, the home wireless network 102 receives allocation of a network address. In one embodiment, an allocation management resource 181 (such as a network address server) in or associated with the home wireless network 102 allocates the network address for use by the mobile communication device 121.

In processing operation 930, the home wireless network 102 communicates the allocated network address from the home wireless network 102 through the visited wireless network 101 and wireless access point 131 to the mobile communication device 121. The mobile communication device 121 is now able to communicate with a remote network 199 through the core V-123 and core H-123.

Note again those techniques herein are well suited to facilitate processing of available physical infrastructure information and generation of a proposed wireless network installation plan for implementation of the new wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
receiving input from a first wireless network operated by a first service provider, the input generated in response to a mobile communication device requesting use of wireless services provided by the first wireless network;
receiving allocation of a network address for use by the mobile communication device;
communicating the allocated network address from a second wireless network through the first wireless network to the mobile communication device, the second wireless network operated by a second service provider; and
wherein the allocated network address supports conveyance of communications through the first wireless network between the mobile communication device and a remote network via the wireless services provided by the first wireless network.

2. The method as in claim 1, wherein the network address is allocated by an allocation management resource associated with inthe second wireless network in response to successful authentication of the mobile communication device by the second wireless network to use the first wireless network.

3. The method as in claim 1, wherein the input from the first wireless network includes authentication credentials provided by the mobile communication device to obtain the network address.

4. The method as in claim 1, wherein the first wireless network is a visited wireless network; and
wherein the second wireless network is home wireless network to which a user of the mobile communication device subscribes, the first service provider providing wireless access to the mobile communication device based on a service agreement between the second service provider and the first service provider.

5. The method as in claim 1 further comprising:
prior to the first wireless network providing the mobile communication device access to the remote network via the wireless services:
based on the input, and successful authentication of the mobile communication device to use the first wireless network, retrieving policy control information assigned to the mobile communication device, the policy control information controlling data flows associated with the mobile communication device; and
communicating the policy control information from the second wireless network to the first wireless network, the policy control information implemented by the first wireless network to control communications between the mobile communication device through the first wireless network and the remote network based on the network address allocated to the mobile communication device.

6. The method as in claim 1 further comprising:
programming the mobile communication device to include a network identifier value assigned to the second wireless network, the network identifier value disposed in a priority list to bias the mobile communication device to connect the second wireless network instead of the first wireless network.

7. The method as in claim 1 further comprising:
providing notification to the mobile communication device, the notification indicating that the first wireless network is part of the second wireless network operated by the second service provider.

8. The method as in claim 1, wherein the first wireless network provides wireless connectivity to the mobile communication device in accordance with SIM (Subscriber Identity Module) information assigned to the mobile communication device, the SIM information supporting use of the second wireless network.

9. The method as in claim 1, wherein the second wireless network controls operation of the first wireless network providing wireless connectivity to the mobile communication device, the wireless connectivity providing the mobile communication device direct access to the remote network through the first wireless network. the direct access bypassing the second wireless network.

10. The method as in claim 1 further comprising:
receiving wireless link usage information of the mobile communication device using the first wireless network, the wireless link usage information generated by the first wireless network.

11. The method as in claim 10 further comprising:
in the second wireless network, applying the wireless link usage information to an account associated with a user of the mobile communication device.

12. The method as in claim 1 further comprising:
based on the input, retrieving data flow control information assigned to the mobile communication device, the data flow control information operative to control the communications through the first wireless network between the mobile communication device and the remote network; and
communicating the data flow control information from the second wireless network to the first wireless network.

13. The method as in claim 12, wherein the data flow control information is implemented by the first wireless network to control conveyance of the communications between the mobile communication device through the first wireless network and the remote network, the conveyance of the communications controlled based on the network address allocated to the mobile communication device.

14. The method as in claim 1, wherein use of the allocated network address by the communication device enables the communication device to communicate through the first wireless network to the remote network, wherein the conveyance of the communications bypasses the second wireless network.

15. The method as in claim 1 further comprising:
receiving the input from the first wireless network based on a temporary wireless connection between the mobile communication device and a wireless base station of the first wireless network.

16. The method as in claim 1 further comprising:
at the second wireless network, receiving authentication credentials communicated over a communication path from the mobile communication device through the first wireless network, the authentication credentials provided by the mobile communication device to use the wireless services provided by the first wireless network.

17. The method as in claim 16, wherein the communication path includes a local area network established between the mobile communication device and a wireless base station in the first wireless network.

18. The method as in claim 1 further comprising:
in response to authenticating the mobile communication device based on messages conveyed from the mobile communication device through the first wireless network to the second wireless network, communicating a notification from the second wireless network to the first wireless network, the notification indicating that the mobile communication device has been authenticated to use the first wireless network.

19. The method as in claim 1, wherein the network address allocated for use by the mobile communication device is a second network address, the method further comprising:

prior to communicating the second network address from the second wireless network through the first wireless network to the mobile communication device, communicating a first network address through the first wireless network to the mobile communication device, the first network address supporting authentication of the mobile communication with the second wireless network device prior to allocation of the second network address.

20. The method as in claim 19, wherein the second network address is used by the mobile communication device to communicate credentials from the mobile communication device through the first wireless network to an authentication server in the second wireless network, the method further comprising:
subsequent to authentication of the mobile communication device, communicating a release message through the first wireless network to the mobile communication device, the release message causing the mobile communication device to request the allocation of the second network address.

21. A method comprising:
receiving input from a first wireless network operated by a first service provider, the input generated in response to a mobile communication device requesting use of wireless services provided by the first wireless network, wherein the input is received from the first wireless network through a temporary VLAN (Virtual Local Area Network) associated with the first wireless network, the first wireless network supporting communications between the mobile communication device and a second wireless network;
receiving allocation of a network address for use by the mobile communication device: and
communicating the allocated network address from the second wireless network through the first wireless network to the mobile communication device, the second wireless network operated by a second service provider.

22. A system comprising:
a communication management resource operative to:
receive input from a first wireless network operated by a first service provider, the input generated in response to a mobile communication device requesting use of wireless services provided by the first wireless network;
receive allocation of a network address for use by the mobile communication device;
communicate the allocated network address from a second wireless network through the first wireless network to the mobile communication device, the second wireless network operated by a second service provider; and
control operation of the first wireless network providing wireless connectivity to the mobile communication device, the wireless connectivity providing the mobile communication device direct access through the first wireless network to a remote network via use of the network address, the direct access bypassing the second wireless network allocated for use by the mobile communication device.

23. The system as in claim 22, wherein the communication management resource is further operative to:
based on the input, and successful authentication of the mobile communication device to use the first wireless network, retrieve policy control information assigned to the mobile communication device, the policy control information controlling data flows associated with the mobile communication device; and communicate the policy control information from the second wireless network to the first wireless network, the policy control information implemented by the first wireless network to control communications between the mobile communication device through the first wireless network and the remote network based on the network address allocated to the mobile communication device.

24. The system as in claim 22, wherein the communication management resource is further operative to:
provide notification to the mobile communication device, the notification indicating that the first wireless network is part of the second wireless network operated by the second service provider.

25. The system as in claim 22, wherein the communication management resource is further operative to:
receive the input from the first wireless network through a VLAN (Virtual Local Area Network) associated with the first wireless network supporting communications between the mobile communication device and the second wireless network.

26. The system as in claim 22, wherein the second wireless network controls attributes of the first wireless network providing wireless connectivity to the mobile communication device, the wireless connectivity providing the mobile communication device direct access to the remote network. the direct access bypassing the second wireless network.

27. The system as in claim 22, wherein the communication management resource is further operative to:
receive wireless link usage information of the mobile communication device using the first wireless network, the wireless link usage information generated by the first wireless network.

28. The system as in claim 27, wherein the communication management resource is further operative to:
in the second wireless network, apply the wireless link usage information to an account associated with a user of the mobile communication device.

* * * * *